United States Patent
Shintani et al.

(10) Patent No.: US 10,051,227 B1
(45) Date of Patent: Aug. 14, 2018

(54) TECHNIQUES FOR MANAGING TRANSITION FROM ATSC 1.0 TO ATSC 3.0

(71) Applicant: Sony Corporation, Tokyo (JP)

(72) Inventors: Peter Shintani, San Diego, CA (US); Robert Noel Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/673,639

(22) Filed: Aug. 10, 2017

(51) Int. Cl.
  *H04N 5/50* (2006.01)
  *H04N 5/46* (2006.01)
  *H04N 5/445* (2011.01)

(52) U.S. Cl.
  CPC .......... *H04N 5/50* (2013.01); *H04N 5/44513* (2013.01); *H04N 5/46* (2013.01)

(58) Field of Classification Search
  CPC ......... H04N 5/50; H04N 5/44513; H04N 5/46
  USPC ........................................................ 348/570
  See application file for complete search history.

(56) References Cited

U.S. PATENT DOCUMENTS

| | | | |
|---|---|---|---|
| 8,589,979 B2 | 11/2013 | Kuh | |
| 2009/0044247 A1* | 2/2009 | Shibahara | H04N 5/4401 725/152 |
| 2010/0060786 A1* | 3/2010 | Kim | H04N 5/50 348/463 |
| 2010/0177252 A1* | 7/2010 | Larsen | H04N 5/50 348/732 |
| 2010/0235859 A1* | 9/2010 | Takaya | H04N 5/50 725/38 |
| 2013/0007830 A1 | 1/2013 | Klappert et al. | |
| 2013/0305289 A1* | 11/2013 | Patel | H04N 5/44543 725/44 |

OTHER PUBLICATIONS

"ATSC—Call for Proposals for ATSC-3.0 Physical Layer—A Terrestrial Broadcast Standard", ATSC Technology Group 3 (ATSC 3.0), Mar. 26, 2013.

* cited by examiner

*Primary Examiner* — Michael Lee
(74) *Attorney, Agent, or Firm* — John L. Rogitz

(57) ABSTRACT

A channel change detection feature is incorporated into future ATSC 1.0 receivers, future ATSC 3.0 receivers, and through a modification, to legacy ATSC 1.0 receivers that can detect new Program and System Information Protocol (PSIP) signaling. A TV or other digital video receiver occasionally performs an automatic channel programming scan. If it detects that a channel has disappeared, then the receiver re-scans the spectrum to update the channel map. If any changes in the channel map occurs, an indication is implied that some ATSC 1.0 and ATSC 3.0 stations have been shuffled.

20 Claims, 5 Drawing Sheets

TECHNIQUES FOR MANAGING TRANSITION FROM ATSC 1.0 TO ATSC 3.0

FIELD

The present application relates to technically inventive, non-routine solutions that are necessarily rooted in computer technology and that produce concrete technical improvements.

BACKGROUND

Technical and regulatory changes are driving changes in digital broadcast systems. The Federal Communications Commission (FCC) is requiring broadcasters to change channel assignments and at the same time Advanced Television Systems Committee (ATSC) 3.0 stations will replace legacy 1.0 stations. As understood herein, channel detection must be accommodated during the transition period, which may last for many years, because as TV channels shift frequencies and/or types of broadcast from ATSC 1.0 to ATSC 3.0, the TV receivers must be made aware of the changes. As also understood herein, current ATSC 1.0 receivers cannot detect any new signaling to support automated channel changing data. This is problematic because during spectrum packing and the transition period from ATSC 1.0 to 3.0 broadcast, channel assignments are expected to change in an unpredictable manner such that required channel schedule information is unreliable or perhaps even unavailable.

SUMMARY

Accordingly, techniques are disclosed to incorporate a channel change detection feature into future ATSC 1.0 receivers, future ATSC 3.0 receivers, and through a modification, to legacy ATSC 1.0 receivers that can detect new Program and System Information Protocol (PSIP) signaling. A TV or other digital video receiver occasionally performs an automatic channel programming scan. If it detects that a channel has disappeared, then the receiver re-scans the spectrum to update the channel map. If any changes in the channel map occurs, an indication is implied that some ATSC 1.0 and ATSC 3.0 stations have been shuffled.

In one aspect, a digital video receiver includes at least one video display, at least one processor, and at least one storage with instructions executable by the processor to execute an initial channel scan of a video channel spectrum that has Advanced Television Systems Committee (ATSC) 1.0 channels and ATSC 3.0 channels. The instructions are executable to based on the initial channel scan, generate an initial channel map of available video channels, and then after the initial channel scan, automatically and without user command re-scan at least a portion of the video channel spectrum. The instructions are executable to, responsive to a channel in the channel map not being detected during the re-scan, generate a new channel map for use in lieu of the initial channel map.

In some implementations, the initial channel scan is executed at least in part using an ATSC 1.0 tuner, the initial channel map includes Program and System Information Protocol (PSIP) data representing ATSC 1.0 channels, and the initial channel map does not represent any of the ATSC 3.0 channels. In other implementations, the initial channel scan is executed at least in part using an ATSC 3.0 tuner, and the channel map includes PSIP data representing ATSC 1.0 channels and Internet Protocol (IP) information representing ATSC 3.0 channels.

In this latter example, the instructions may be executable to present on the display a channel listing based at least in part on the initial channel map or new channel map, with the channel listing including a consolidated listing all channels detected in the initial channel scan or re-rescan, such that the consolidated listing includes ATSC 1.0 channels and ATSC 3.0 channels in a single listing. Or, separate first and second channel listings may be presented with the first channel listing including a listing of only ATSC 1.0 channels and the second channel listing including a listing of only ATSC 3.0 channels. Yet again, the presented channel listing may include only ATSC 3.0 channels, with no ATSC 1.0 channels being presented in a listing on the display. To this end, the instructions may be executable to present on the display at least one user interface (UI) with at least first and second selectors. The first selector can be selected to present a channel listing showing a listing of both ATSC 1.0 channels and ATSC 3.0 channels. The second selector can be selected to present a channel listing of only ATSC 3.0 channels.

In another aspect, a device includes at least one computer storage that is not a transitory signal and that includes instructions executable by at least one processor to present on at least one display at least one user interface (UI). The UI in turn includes a first selector selectable to cause both ATSC 1.0 and ATSC 3.0 to be presented on the at least one display in a single consolidated listing, a second selector selectable to cause separate channel listings, one for ATSC 1.0 channels and one for ATSC 3.0 channels, to be presented on the at least one display, and a third selector selectable to cause only a single channel listing to be presented listing only ATSC 3.0 channels. The instructions are executable to present at least one channel listing according to selection of the first, second, or third selector.

In another aspect, a method includes executing an initial channel scan of a video channel spectrum comprising Advanced Television Systems Committee (ATSC) channels of a first version and ATSC channels of a second version. The method includes, based on the initial channel scan, generating an initial channel map of available video channels, and after the initial channel scan, automatically without user command re-scanning at least a portion of the video channel spectrum. Responsive to a channel in the channel map not being detected during the re-scan, the method generates a new channel map for use in lieu of the initial channel map.

The details of the present disclosure, both as to its structure and operation, can be best understood in reference to the accompanying drawings, in which like reference numerals refer to like parts, and in which:

DETAILED DESCRIPTION

Figure 1:
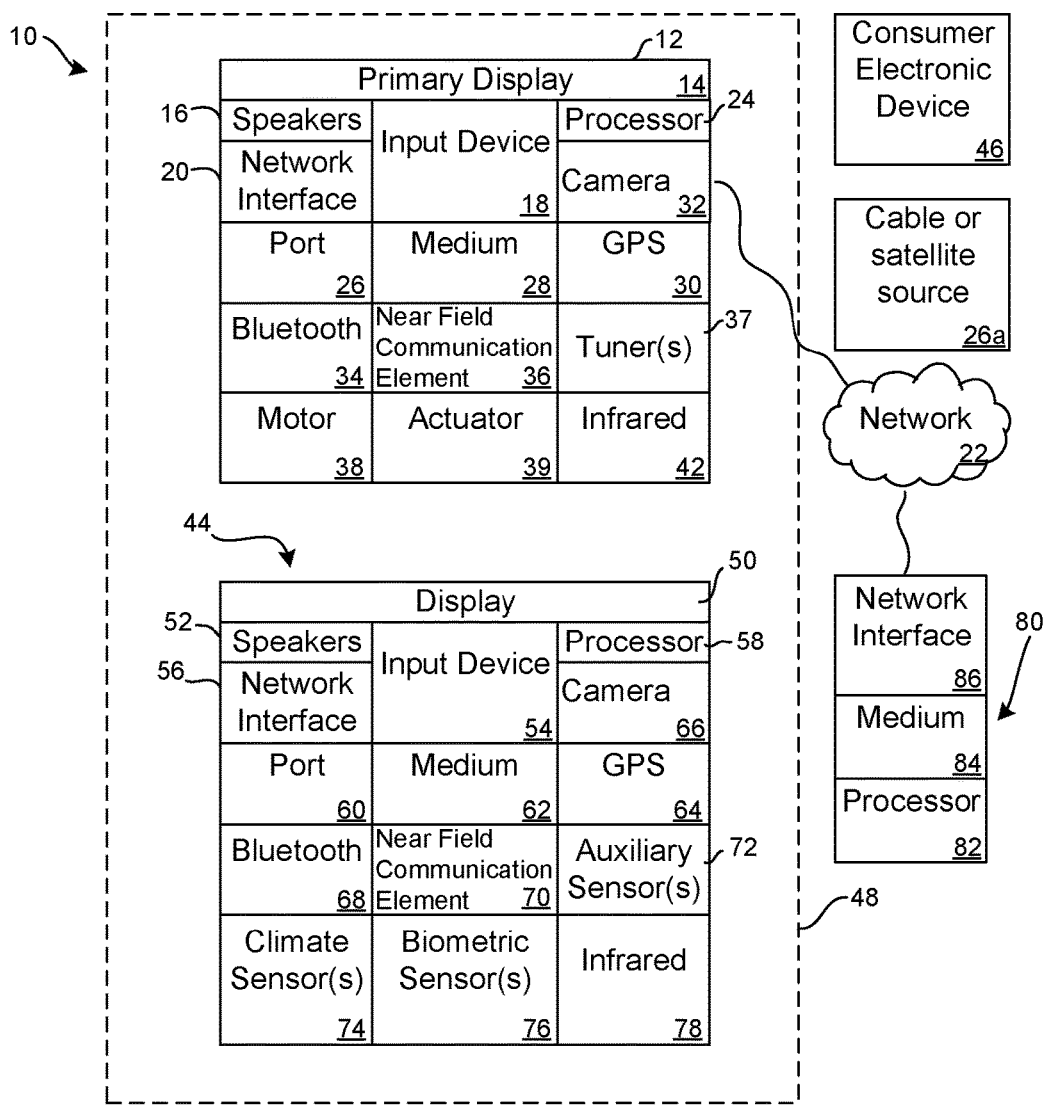
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles.

Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more tuners 37 such as ATSC 1.0 and/or ATSC 3.0 tuner/receivers communicating with the processor 24. The AVDD 12 may include sensors 38 such as a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.), one or more climate sensors (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a web cam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44. The second CE device 46 may be implemented by a digital video receiver such as a digital TV, mobile telephone, or other device for playing received digital video.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
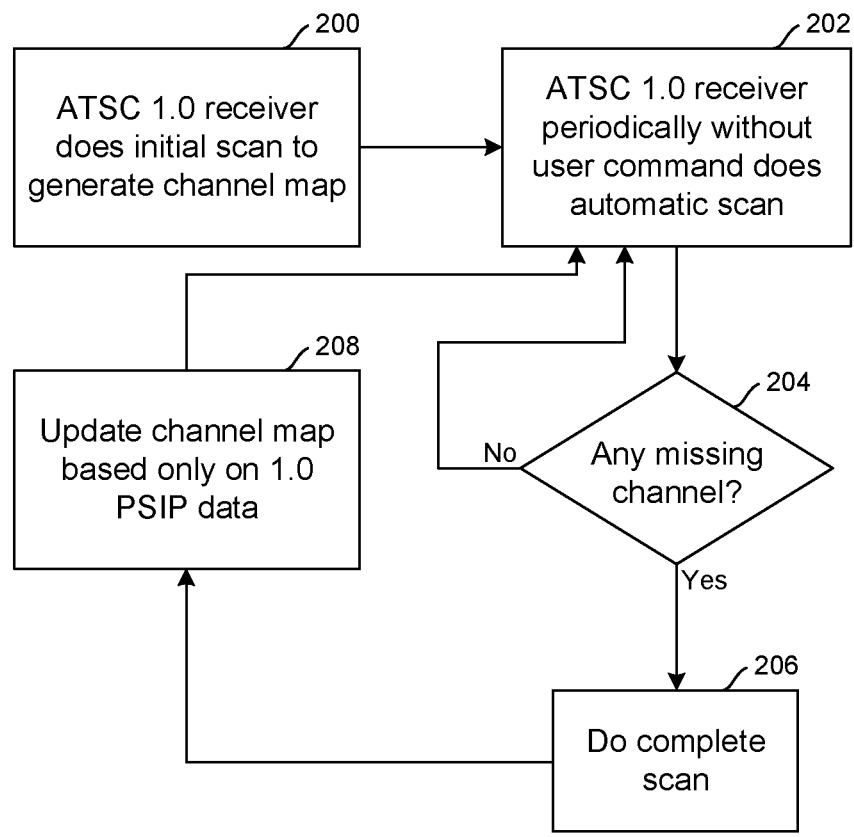
FIGS. 2 and 3 are flow charts of example logic consistent with present principles.

Now referring to FIG. 2, assuming the tuner in FIG. 1 is an ATSC 1.0 receiver, at block 200 the ATSC 1.0 receiver performs an initial channel frequency scan to identify all ATSC 1.0 channels in the frequency spectrum. This initial scan typically is performed on initial power-on "out of the box", when the consumer first energizes the video display device containing he ATSC 1.0 receiver. The device can know it needs to perform an initial scan by noting that it has no current channel map and, thus, requires a channel scan to generate a channel map.

The spectrum scanned may be initially defined, in an example, by the device manufacturer. The spectrum band may be dynamically established in other embodiments. For instance, upon initial energization the display device may, through its network interface, contact a server whose network address is programmed into the device by the manufacturer, with the server instructing the display device as to the frequency band to be scanned. In this way, as ATSC 3.0 channels are added to the spectrum, possibly expanding the frequency band and moving ATSC 1.0 channel frequency assignments, the server can know the latest spectrum information and provide it to the display device for the initial scan.

When the initial scan is complete, an initial channel map is generated that correlates channels to assigned frequencies as detected during the scan, typically using PSIP data received during the channel scan.

Periodically thereafter, recognizing that during the period of transition from ATSC 1.0 to ATSC 3.0 the frequencies assigned to channels may change, to relieve the consumer of the chore of remembering to execute a re-scan of the spectrum, the logic moves to block 202 to commence a re-scan of the spectrum. This may be done without user command. The periodicity may be regular, e.g., once every week or once every month at a predetermined time, or it may be irregular, e.g., whenever a network server in communication with the display device signals to the display device that it should perform a re-scan of the spectrum.

During the re-scan, for every frequency being scanned, the existing channel map of the display device may be checked to determine if the channel map indicates that a particular channel should be detected on the current frequency. Should a frequency be scanned and be found to not be carrying the expected channel indicated in the existing channel map at decision diamond 204, either by virtue of no active channel being detected on the frequency or by virtue of a channel being detected whose PSIP data indicates that it a different channel from that indicated in the existing channel map, a complete re-scan is indicated at block 206. The complete spectrum is then re-scanned to generate an updated channel map at block 208. The updated channel map, like the (now superseded) channel map used to start the re-scan, contains only ATSC 1.0 channels, and no ATSC 3.0 channels, because the ATSC 1.0 receiver is not expected to recognize ATSC 3.0 channels.

Figure 3:
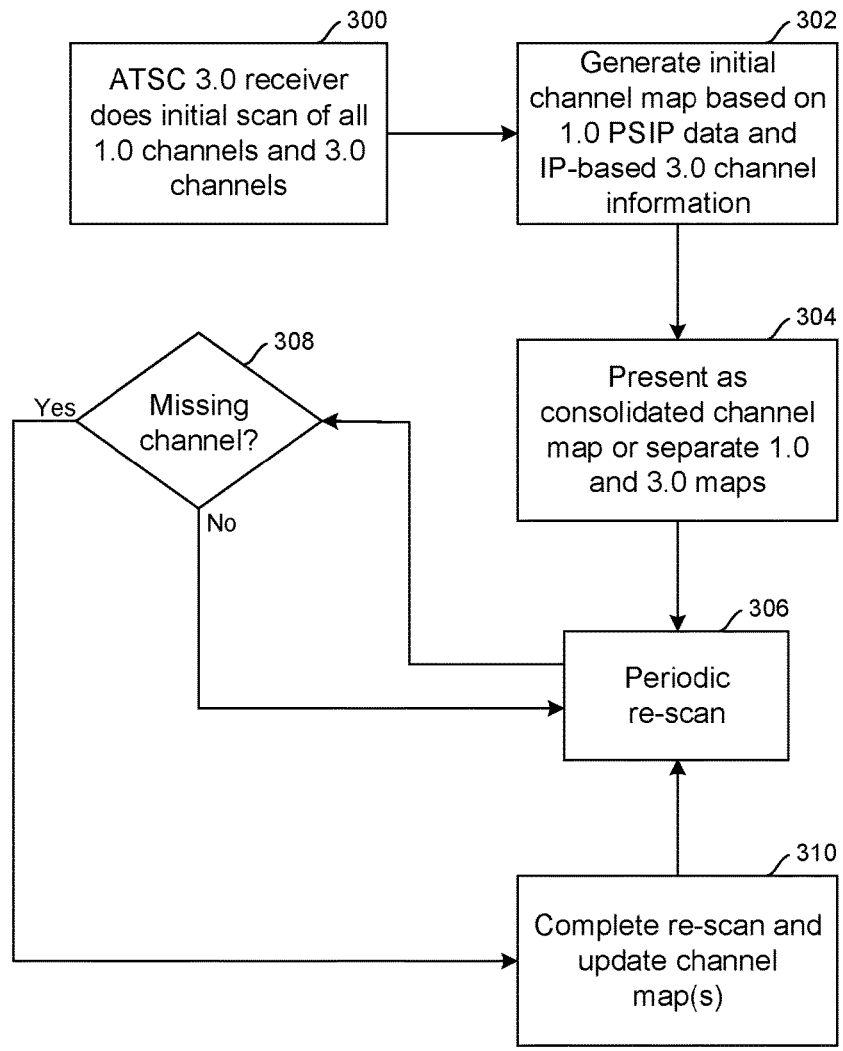

FIG. 3 shows alternative logic consistent with present principles when the display device tuner includes an ATSC 3.0 receiver, which is expected to recognize both ATSC 3.0 channels and their attendant channel information data, typically in IP format, as well as ATSC 1.0 channels and their attendant PSIP data.

At block 300 the ATSC 3.0 receiver performs an initial channel frequency scan to identify all ATSC 1.0 channels and all ATSC 3.0 channels in the frequency spectrum. This initial scan typically is performed on initial power-on "out of the box", when the consumer first energizes the video display device containing he ATSC 3.0 receiver. The device can know it needs to perform an initial scan by noting that it has no current channel map and, thus, requires a channel scan to generate a channel map.

The spectrum scanned may be initially defined, in an example, by the device manufacturer. The spectrum band may be dynamically established in other embodiments. For instance, upon initial energization the display device may, through its network interface, contact a server whose network address is programmed into the device by the manufacturer, with the server instructing the display device as to the frequency band to be scanned. In this way, as ATSC 3.0 channels are added to the spectrum, possibly expanding the frequency band and moving ATSC 1.0 channel frequency assignments, the server can know the latest spectrum information and provide it to the display device for the initial scan.

When the initial scan is complete, an initial channel map is generated at bock 302 that correlates channels to assigned frequencies as detected during the scan, typically using PSIP data received during the channel scan for ATSC 1.0 channels and IP data for ATSC 3.0 channels. When a consumer wishes to present a channel listing at block 304, the channel map is used to present the channel listing either as a single listing consolidating all ATSC 1.0 and 3.0 channels or as separate listings, one for ATSC 1.0 channels and one for ATSC 3.0 channels, according to principles discussed further below.

Periodically thereafter, recognizing that during the period of transition from ATSC 1.0 to ATSC 3.0 the frequencies assigned to channels may change, to relieve the consumer of the chore of remembering to execute a re-scan of the spectrum, the logic moves to block 306 to commence a re-scan of the spectrum. This may be done without user command. The periodicity may be regular, e.g., once every week or once every month at a predetermined time, or it may be irregular, e.g., whenever a network server in communication with the display device signals to the display device that it should perform a re-scan of the spectrum.

During the re-scan, for every frequency being scanned, the existing channel map of the display device may be checked to determine if the channel map indicates that a particular channel should be detected on the current frequency. Should a frequency be scanned and be found to not be carrying the expected channel indicated in the existing channel map at decision diamond 308, either by virtue of no active channel being detected on the frequency or by virtue of a channel being detected whose PSIP or IP data indicates that it a different channel from that indicated in the existing channel map, a complete re-scan is indicated at block 310. The complete spectrum is then re-scanned to generate an updated channel map at block. The updated channel map, like the (now superseded) channel map used to start the re-scan, contains both ATSC 1.0 channels and ATSC 3.0 channels.

FIGS. 4-7 illustrate example user interfaces (UI) consistent with present principles. A UI 400 in FIG. 4 may be presented on the display 14 of the display device and/or audibly on a speaker thereof to enable a consumer to select one of several options for presenting a listing of available channels. It is to be understood that the UIs in FIGS. 4-7 are for devices with ATSC 3.0 receivers, since devices with ATSC 1.0 receivers typically can present listings only for ATSC 1.0 channels.

Figures 4, 5:
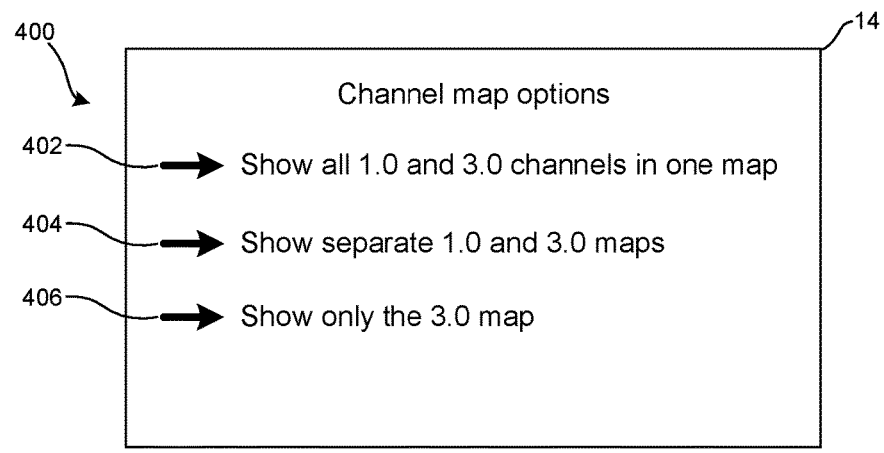
FIGS. 4-7 are screen shots of example user interfaces (UI) consistent with present principles.

A first selector 402 may be presented that can be selected by the consumer using, e.g., touch screen capability of the display 14, a point-and-click remote controller (RC), voice input, or other appropriate input means to cause all channels, both ATSC 1.0 and ATSC 3.0, to be presented in a single consolidated listing when, e.g., the consumer subsequently selects "guide" or otherwise commands the device to present a channel listing subsequent to selection of the first selector. Alternatively, the single consolidated listing may be presented immediately upon selection of the first selector. An example consolidated channel listing is illustrated in FIG. 5. In FIG. 5, a channel column 500 presents available channel numbers (as determined by the channel scan described previously) in a monotonically increasing order, along with a second column 502, if desired, which indicates, for each channel, whether the channel is an ATSC 1.0 or ATSC 3.0 channel. This indication of ATSC version may be useful for a consumer who may wish to view the higher version channel in a set of two similar channels, for example.

Figure 6:
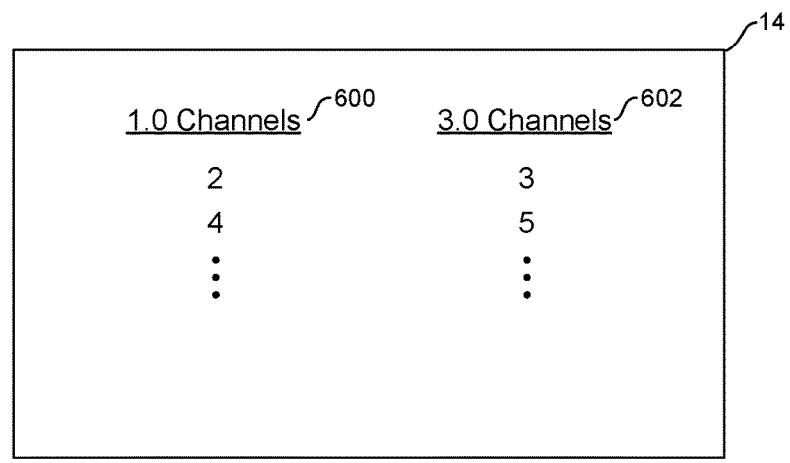

FIG. 4 also shows that a second selector 404 may be presented and may be selectable to cause separate channel listings, one for ATSC 1.0 channels and one for ATSC 3.0 channels, to be presented when a command is received to present a channel listing. One example of such a presentation is illustrated in FIG. 6, in which a first column 600 is presented listing only ATSC 1.0 channels, and a second column 602 is presented listing only ATSC 3.0 channels.

Figure 7:
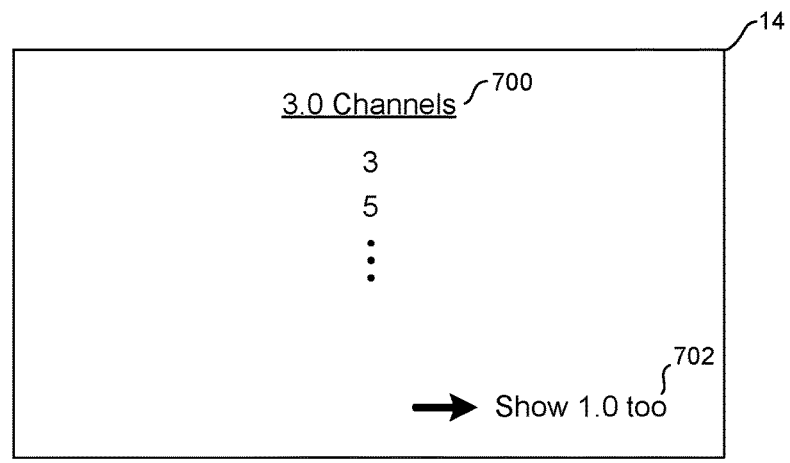

FIG. 4 additionally shows that a third selector 406 may be presented and may be selectable to cause only a single channel listing to be presented listing only ATSC 3.0 channels, on the assumption that a consumer may not wish to view any ATSC 1.0 channels at all. One example of such a presentation is illustrated in FIG. 7, in which a single column 700 is presented listing only ATSC 3.0 channels, with no listing of any ATSC 1.0 channels appearing. If desired, a selector 702 may be provided that can be selected to cause a listing of ATSC 1.0 channels to be presented on the display.

The limits of the frequency band scanned in the logic of FIGS. 2 and 3 may be established using a Neural Network or a Convolutional Neural Network, to improve the image recognition and classification of objects. For example, an algorithm may be used to monitor the movement of channel assignments and coupled with information about the FCC's spectrum packing, i.e., the frequency range and bands assigned to broadcasters, the software can adjust the scanning range and detect the new channel assignments as channels disappear and appear. This technique can be augmented by monitor web-sites that are used to notify consumers of channel movement.

While particular techniques are herein shown and described in detail, it is to be understood that the subject matter which is encompassed by the present application is limited only by the claims.

What is claimed is:

1. A digital video receiver comprising:
   at least one video display;
   at least one processor; and
   at least one storage with instructions executable by the processor to:
   execute an initial channel scan of a video channel spectrum comprising Advanced Television Systems Committee (ATSC) 1.0 channels and ATSC 3.0 channels;
   based on the initial channel scan, generate an initial channel map of available video channels;
   after the initial channel scan, automatically without user command re-scan at least a portion of the video channel spectrum; and
   responsive to a channel in the channel map not being detected during the re-scan, generate a new channel map for use in lieu of the initial channel map, wherein the initial channel scan is executed at least in part using an ATSC 3.0 tuner, the channel map comprising Program and System Information Protocol (PSIP) data representing ATSC 1.0 channels and Internet Protocol (IP) information representing ATSC 3.0 channels.

2. The digital video receiver of claim 1, wherein the instructions are executable to execute the initial channel scan by establishing contact with a network a server and receiving therefrom identification of a frequency band to be scanned, such that as ATSC 3.0 channels are added to the video channel spectrum, latest spectrum information is provided by the network server to the digital video receiver for the initial channel scan.

3. The digital video receiver of claim 1, wherein the instructions are executable to generate the new channel map responsive to PSIP data indicating a channel at a location that it a different channel from that indicated in the initial channel map.

4. The digital video receiver of claim 1, wherein the instructions are executable to:
   present on the display a channel listing based at least in part on the initial channel map or new channel map, the channel listing comprising a consolidated listing all channels detected in the initial channel scan or re-rescan, the consolidated listing comprising ATSC 1.0 channels and ATSC 3.0 channels in a single listing.

5. The digital video receiver of claim 1, wherein the instructions are executable to:

present on the display first and second channel listings based at least in part on the initial channel map or new channel map, the first channel listing comprising a listing of only ATSC 1.0 channels, the second channel listing comprising a listing of only ATSC 3.0 channels.

6. The digital video receiver of claim 1, wherein the instructions are executable to:
present on the display a single channel listing based at least in part on the initial channel map or new channel map, the single channel listing comprising a listing of only ATSC 3.0 channels.

7. The digital video receiver of claim 1, wherein the instructions are executable to:
present on the display a user interface (UI) comprising at least first and second selectors, the first selector being selectable to present a channel listing comprising a listing of both ATSC 1.0 channels and ATSC 3.0 channels, the second selector being selectable to present a channel listing comprising a listing of only ATSC 3.0 channels.

8. A method, comprising:
executing an initial channel scan of a video channel spectrum comprising Advanced Television Systems Committee (ATSC) channels of a first version and ATSC channels of a second version;
based on the initial channel scan, generating an initial channel map of available video channels;
after the initial channel scan, automatically without user command re-scanning at least a portion of the video channel spectrum; and
responsive to a channel in the channel map not being detected during the re-scan, generating a new channel map for use in lieu of the initial channel map, wherein the initial channel scan is executed at least in part using an ATSC 3.0 tuner, the channel map comprising Program and System Information Protocol (PSIP) data representing ATSC 1.0 channels and Internet Protocol (IP) information representing ATSC 3.0 channels.

9. The method of claim 8, wherein the initial channel scan is executed at least in part using an ATSC 1.0 tuner.

10. The method of claim 8, comprising:
presenting on the display a channel listing based at least in part on the initial channel map or new channel map, the channel listing comprising a consolidated listing all channels detected in the initial channel scan or re-rescan, the consolidated listing comprising ATSC channels of both versions in a single listing.

11. The method of claim 8, comprising:
presenting on the display first and second channel listings based at least in part on the initial channel map or new channel map, the first channel listing comprising a listing of only ATSC channels of the first type, the second channel listing comprising a listing of only ATSC channels of the second type.

12. The method of claim 8, comprising:
presenting on the display a single channel listing based at least in part on the initial channel map or new channel map, the single channel listing comprising a listing of only ATSC channels of the second type.

13. The method of claim 8, comprising:
presenting on the display a user interface (UI) comprising at least first and second selectors, the first selector being selectable to present a channel listing comprising a listing of both ATSC channels of the first type and ATSC channels of the second type, the second selector being selectable to present a channel listing comprising a listing of only ATSC channels of the second type.

14. An apparatus, comprising:
at least one computer storage that is not a transitory signal and that comprises instructions executable by at least one processor to:
execute an initial channel scan of a video channel spectrum comprising Advanced Television Systems Committee (ATSC) 1.0 channels and ATSC 3.0 channels;
based on the initial channel scan, generate an initial channel map of available video channels;
after the initial channel scan, automatically without user command re-scan at least a portion of the video channel spectrum; and
responsive to a channel in the channel map not being detected during the re-scan, generate a new channel map for use in lieu of the initial channel map, wherein the initial channel scan is executed at least in part using an ATSC 3.0 tuner, the channel map comprising Program and System Information Protocol (PSIP) data representing ATSC 1.0 channels and Internet Protocol (IP) information representing ATSC 3.0 channels.

15. The apparatus of claim 14, wherein the instructions are executable to execute the initial channel scan by establishing contact with a network a server and receiving therefrom identification of a frequency band to be scanned, such that as ATSC 3.0 channels are added to the video channel spectrum, latest spectrum information is provided by the network server to the digital video receiver for the initial channel scan.

16. The apparatus of claim 14, wherein the instructions are executable to generate the new channel map responsive to PSIP data indicating a channel at a location that it a different channel from that indicated in the initial channel map.

17. The apparatus of claim 14, wherein the instructions are executable to:
present on at least one display a channel listing based at least in part on the initial channel map or new channel map, the channel listing comprising a consolidated listing all channels detected in the initial channel scan or re-rescan, the consolidated listing comprising ATSC 1.0 channels and ATSC 3.0 channels in a single listing.

18. The apparatus of claim 14, wherein the instructions are executable to:
present on at least one display first and second channel listings based at least in part on the initial channel map or new channel map, the first channel listing comprising a listing of only ATSC 1.0 channels, the second channel listing comprising a listing of only ATSC 3.0 channels.

19. The apparatus of claim 14, wherein the instructions are executable to:
present on at least one display a single channel listing based at least in part on the initial channel map or new channel map, the single channel listing comprising a listing of only ATSC 3.0 channels.

20. The apparatus of claim 14, wherein the instructions are executable to:
present on at least one display a user interface (UI) comprising at least first and second selectors, the first selector being selectable to present a channel listing comprising a listing of both ATSC 1.0 channels and ATSC 3.0 channels, the second selector being selectable to present a channel listing comprising a listing of only ATSC 3.0 channels.

* * * * *